United States Patent Office 3,661,827
Patented May 9, 1972

3,661,827
METHOD FOR PREPARING A WATER-DISPERSIBLE ACRYLIC COPOLYMER
David D. Taft, Minneapolis, Minn., assignor to Ashland Oil, Inc., Ashland, Ky.
No Drawing. Filed July 17, 1968, Ser. No. 745,363
Int. Cl. C08f 19/10, 19/00
U.S. Cl. 260—29.6 MN          3 Claims

ABSTRACT OF THE DISCLOSURE

Water dispersible copolymers are prepared and dispersed or diluted in water without the use of emulsifiers. A water dispersible acrylic copolymer can be prepared in the absence of emulsifiers by the copolymerization of vinyl comonomers (e.g. methyl methacrylate, styrene, and acrylic acid) in a mixture of water miscible organic solvent, water and a neutralizing agent (e.g. a tertiary amine such as triethyl amine).

BACKGROUND OF THE INVENTION

Copolymers of alpha, beta-unsaturated carboxylic acids (e.g. acrylic and methacrylic acids) and their esters (e.g. methyl methacrylate) are well known in the art. Organic solvent solutions of such copolymers are useful (in varying degrees of effectiveness) as the principal film-forming constituent in coating compositions (e.g. paints) intended for such uses as paper and textile coatings, hair spray formulations, automotive enamels, and the like. However, aqueous dispersions of the water dispersible analogs of such copolymers have not found the widespread commercial acceptance that has been experienced by the organic solvent solutions of the copolymers. For example, the latter are frequently used in automotive top-coat enamels because the hard coatings which can be obtained from them have excellent gloss and durability, as well as other advantages. By contrast, when such copolymers are made water dispersible and used to form water-based enamels, the resulting enamels make poor automotive finishes.

At the present time, several methods are known whereby water dispersible copolymers of alpha, beta-unsaturated carboxylic acids and their esters can be prepared.

One such method involves the copolymerization of these monomers in an aqueous system. According to this method, the comonomers are emulsified in water in the presence of surface active agents or emulsifiers and copolymerized under suitable copolymerization conditions. The emulsifiers also serve to stabilize the particles of copolymer which are formed under the conditions of copolymerization. Using this method, an emulsion copolymer is formed which usually has a high molecular weight. Coatings prepared from these emulsion copolymers, whether hardened alone or by cross-linking with suitable cross-linking agents such as aminoplast resins, have an appreciable degree of residual water sensitivity because of the presence in the cured films of the surface active agents or emulsifiers used in the emulsion polymerization process. Consequently, such emulsion copolymers have found limited applications in those environments requiring a high degree of durability (e.g. exterior industrial finishes).

Another method of preparing aqueous copolymers involves the manufacture of the copolymers in organic solvents using monomers (e.g. acrylic acid) which produce a copolymer having an appreciable number of pendant carboxylic acid groups. Typically, a water miscible solvent is used (e.g. n-butanol). Upon completion of the copolymerization, substantially all or a portion of the solvent can be removed from the copolymer by distillation. The residual acidity of the viscous copolymer solution is then neutralized with an amine or other neutralizing agent to render the copolymer water dispersible or dilutable. This process is lengthy and ordinarily requires a costly solvent removal step.

More recently, research efforts have been directed to methods of manufacture of water dispersible copolymers by solvent solution techniques under conditions permitting a minimum of solvent to be used, thereby eliminating the need for removing as much copolymerization solvent as previously required. Although methods have been found which permit the preparation of copolymers at substantially higher non-volatile contents than heretofore thought possible, it has been found that viscosities of solutions of these copolymers are sufficiently high as to make them somewhat difficult to handle (e.g. a viscosity of 240 stokes at 80% non-volatile).

SUMMARY OF THE INVENTION

I have discovered that water dispersible copolymers can be prepared by an improved process which does not involve the use of intentionally added surface active agents or emulsifiers. Because of this, I am able to obtain a water dispersed copolymer which, when used as a principal film-forming constituent in coating compositions, has substantially improved properties. Among the several advantages of my invention are the reduced residual water sensitivity of hardened coatings prepared from these water dispersed copolymers when compared with conventional emulsion copolymers, and, in some instances, an improved viscosity/solids relationship when compared to other water dispersible or dilutable copolymers which permits the formulation of unusually high solids coating compositions (e.g. paints) without exceeding present viscosity limitations.

Briefly described, my invention involves the copolymerization, under copolymerization conditions, of esters of alpha, beta-unsaturated carboxylic acids with other copolymerizable monomers. The resulting copolymer is heated at high temperatures (e.g. 320°–350° F.) in the presence of a neutralizing agent and water, all in the absence of added emulsifiers or other surface active agents. This heating step can be performed simultaneous with or, less preferably, subsequent to the formation of the copolymer. I have found that this heating step causes esters of alpha, beta-unsaturated carboxylic acids to undergo hydrolysis when conducted in the presence of water and a neutralizing agent. As a result, polymer solubilization sites are established along the copolymer molecule.

In a preferred embodiment, my invention concerns the preparation of water dispersed acrylic copolymers from a mixture of monomers that does not include any significant amount of an alpha, beta-unsaturated carboxylic acid (e.g. acrylic acid). In this embodiment, tri-(alkyl or alkanol) amines are used as the neutralizing agent. Using this preferred form of my invention, I have been able to manufacture coating compositions at non-volatile or solids contents with lower viscosities than expected. Water-based automotive enamels prepared from these preferred copolymers are comparable in their application properties to the corresponding widely used solvent-based enamels.

DETAILED DESCRIPTION

A major feature of this invention is the heating of a copolymer of an ester of an alpha, beta-unsaturated carboxylic acid in the presence of water and one or more neutralizing agents and in the absence of intentionally added emulsifiers. This heating step can be performed at the same temperature used for producing the copolymer and can be performed simultaneous with or subsequent to the production of the copolymer. Organic solvents, preferably water miscible, can be optionally included with the mixture of water and neutralizing agent.

The reaction conditions for the monomers are copolymerization conditions (i.e. those conditions promoting copolymerization of the monomers used). Generally, the temperature used for copolymerization and in the heating step will be within the range of 250°–400° F., more usually within the range of 280°–400° F. Particularly preferred temperatures are those within the range of 320°–370° F. In this connection, it should be noted that water and many common water miscible solvents (e.g. the lower alkanols) have boiling points below 300° F. (e.g. below 290° F.). Typically, the reaction temperature will be maintained substantially constant or uniform (e.g. within a 30 Fahrenheit degree range) during the major or significant part of the polymerization reaction. At these elevated temperatures, the initiator and/or catalyst used during the polymerization is often substantially or completely consumed or degraded. This efficient use of catalysts contributes to the storage stability of the water dispersed copolymers produced by this invention.

Pressure during copolymerization and the heating step is not critical and atmospheric pressure (e.g. an open reactor) can be used. Although superatmospheric pressures are not required, they can be used to advantage. Autogeneous pressure (i.e. the internally generated pressure in a sealed reaction zone) can be conveniently employed as a means of avoiding undesirable losses of water, monomers, and cosolvent. If desired, a part of the autogeneous pressure can be released (e.g. by venting) to maintain a lower pre-selected pressure (maintain 60 p.s.i.g.).

The monomers which can be used in the present invention include all monomers which can be copolymerized under the conditions herein contemplated. A mixture of monomers is used in the practice of the present invention and at least one of the monomers will be an ester of an alpha, beta, ethylenically unsaturated carboxylic acid such as a mono- or di-alkyl or hydroxyalkyl ester of an alpha, beta-unsaturated mono- or di-carboxylic acid. $C_1$–$C_5$ alkyl and hydroxyalkyl esters are preferred. Esters of monocarboxylic acids (e.g. acrylic and methacrylic acids) are particularly preferred.

In preparing the water dispersed copolymers of this invention, the particular monomers used and the amounts thereof can vary. The selection of monomers will depend upon the properties desired in the resultant copolymer, the proposed use of the copolymer, the commercial availability and relative costs of the particular monomers, and other criteria, all of which are well established and known to those skilled in the art. For example, the use of methyl methacrylate is known to impart hardness or durability, and some solvent resistance to films or coatings prepared from its copolymers. Butyl acrylate and butyl methacrylate are known plasticizing monomers which impart flexibility and some durability to such films. Hydroxypropyl methacrylate is a functional monomer which, when incorporated into a copolymer, permits the resulting copolymer to be cross-linked with aminoplasts, epxoxidized materials, and phenolic resins. Acrylic acid and methacrylic acid are known to catalyze the curing of hydroxyalkyl acrylate and methacrylate containing copolymers with aminoplasts and also function as cross-linking agents with epoxies, phenolics, and aminoplasts. Styrene is known to impart gloss and hardness to films made from its copolymers.

Suitable monomer combinations include the following:

butyl acrylate/vinyl toluene/methacrylic acid
2-ethylhexyl acrylate/chlorostyrene/itaconic acid
methyl crotonate/vinyl acetate/crotonic acid
methyl methacrylate/ethoxyethyl acrylate/lauryl methacrylate
methyl methacrylate/acrylonitrile
butyl acrylate/styrene/methacrylamide
lauryl methacrylate/vinyl acetate/cinnamic acid
ethyl acrylate/vinyl toluene/N,N'-dimethyl aminoethyl methacrylate
ethyl acrylate/hydroxypropyl acrylate/styrene
vinyl acetate/dioctyl maleate/dibutyl fumarate/butyl acrylate
methyl methacrylate/vinyl stearate/vinyl acetate/maleic anhydride Although the mixture of monomers used to form the copolymers of this invention can contain, on a charge basis, from a low of one (1) weight percent to as high as 100 weight percent of monomers which are esters of alpha, beta-unsaturated mono- or di-carboxylic acids, it is more common for such monomers to be used (as a percent of the total monomer charge) at levels of from 15–95 weight percent, and preferably 35–90 weight percent, all on the same basis. Particularly useful copolymers can be made from mixtures of monomers containing more than 50 weight percent of esters of alpha, beta-unsaturated carboxylic acids.

Any neutralizing agent can be used in the practice of this invention. However, all do not serve with equal effectiveness. Ammonia and organic amines (primary, secondary and tertiary) are preferred. A particularly preferred group of neutralizing agents are the amines substituted with alkyl groups or radicals, alkanol groups of radicals, or any mixture thereof. Tertiary amines containing less than 6 carbon atoms in each of the pendant radicals are preferred. Triethyl amine is the preferred neutralizing agent.

When primary and secondary amines (e.g. diethanol amine) are used as neutralizing agents, best results have been obtained with copolymers made from monomer mixtures that included an alpha, beta-unsaturated mono- or di-carboxylic acid.

The copolymerization reaction can be catalyzed or initiated by any free radical initiator which is soluble in water or in the cosolvent. Suitable catalysts and initiators are known in the art. They include azo-bis-isobutyronitrile, t-butyl peracetate; benzoyl peroxide; cumene hydroperoxide; p-chlorobenzoyl peroxide; t-butyl perbenzoate; and 2-(2'-hydroxy ethyl azo)-2,4-dimethyl valeronitrile.

The time required for polymerization of the monomers can vary widely depending upon such factors as the process used, temperature, catalyst, concentration of reactants and the like. Typically, the reaction time will be from 0.5 to 10 or more hours, more usually from 2–6 hours. When the heating step is performed simultaneously with the copolymerization (i.e. copolymerization in the presence of water and a neutralizing agent), no additional time of treatment is required beyond that needed to convert most or all (e.g. 95–100%) of the monomers to polymer. However, when the polymerization is conducted in the absence of water and a neutralizing agent, the subsequent heat treatment of the polymer in the presence of water and a neutralizing agent will generally require 0.5–8 hours (e.g. 2–6 hours) at the temperatures previously indicated (e.g. 350° F.). I prefer to produce the polymers in the presence of water and a neutralizing agent to thereby shorten the total time needed to produce a water dispersible polymer. The copolymerization can be carried out batch-wise or in a continuous manner or, more preferably, by the well known delayed addition technique (a form of batch processing). If desired, various block or graft copolymer techniques can be used also.

The copolymers can be prepared and simultaneously made water dispersible by charging all of the monomers, water neutralizing agent and any cosolvent to a reaction vessel which is then sealed and heated to the desired reaction temperature. The initiator is then added all at once or in increments to the monomer/water/neutralizing agent mixture and the polymerization reaction continued until the desired copolymer has been formed.

In the preferred delayed addition technique, water, a neutralizing agent, and preferably a water miscible solvent are heated to the desired reaction temperature. A solution or mixture of the monomers and an initiator are then added (separately or as a mixture) to the heated water/neutralizing agent mixture over a period of, for example, 1–3 hours. After all of the monomers have been introduced into a reaction zone, additional or booster initiators or catalysts can be added. For example, one or more booster initiators can be added at any time from 0 to 2 hours, preferably 5 minutes to 1 hour, after addition of the monomers has been completed. This booster initiator can be the same or a different initiator than was introduced into the reactor with the monomers. After the booster initiator has been added, the heating of the reaction mixture can be continued, for example, from 30 minutes to 4 hours, preferably 1 to 2 hours, until substantially quantitative conversion (e.g. 90% or more) of the monomers to copolymer has been obtained.

If a water soluble monomer is used, all or a portion of the water and/or neutralizing agent can be included in the mixture of monomers and this mixture added to pre-heated solvent or the remainder of the water. In addition, all or any portion of the water miscible cosolvent can be added with the monomer and/or initiator compositions.

Thus it can be seen that the preferred process of this invention involves the copolymerization of certain monomers under copolymerization conditions with the simultaneous heat treatment of the copolymers in the presence of a neutralizing agent and water. Less preferably the copolymer can be prepared in a solvent solution and subsequently heat treated in the presence of water and a neutralizing agent. This latter procedure is moderately effective in rendering the solvent soluble copolymer water dilutable by the neutralizing agent catalyzed hydrolysis of a portion of the copolymerized ester of the alpha, beta-unsaturated carboxylic acid.

The water dispersed copolymers of this invention can be used in the coating compositions of the prior art as substitutes for the prior art solvent soluble and water dispersible copolymers made from the same or similar monomers. The water dispersed copolymers of this invention are especially suitable for the preparation of compositions (e.g. enamels) adapted for use in forming decorative and protective coatings on a variety of substrates (e.g. metal, paper, wood, etc.).

In the absence of added cross-linking agents, the water dispersed copolymers of this invention can be used to form coating compositions having thermoplastic properties. Alternatively, these water dispersed copolymers can be mixed or blended with compatible cross-linking agents such as aminoplastic, epoxidized materials, and phenolic resins, to thereby obtain thermosetting coating compositions useful as, for example, automotive enamels. Cross-linking resins for acrylic copolymers are well known to those skilled in this art and have been described in patents as well as various texts. A particularly useful group of water soluble cross-linking agents are the water soluble alkylated melamine-formaldehyde resins.

The present invention is further illustrated by the following specific examples that include a preferred embodiment. Unless otherwise indicated, all parts and percentages are by weight.

Example I

This example illustrates the preparation of a water dispersible acrylic copolymer from a mixture of monomers that did not include any alpha, beta-unsaturated carboxylic acid. In this example, the heat treatment of the copolymer was performed simultaneously with the formation of the copolymer (i.e. copolymerization in the presence of water and a neutralizing agent). The neutralizing agent was introduced into the copolymerization zone in admixture with the monomers and initiator using a delayed or incremental addition technique.

Two hundred fifty (250) grams of Cellosolve (a water miscible solvent) and 142 grams of deionized water were placed in a two liter sealed reactor fitted with an agitator and an addition line. The contents of the reactor were then heated to 350° F.

Next, a monomer/initiator/neutralizing agent mixture was added to the reactor over a period of one hour and fifty minutes. The temperature at the end of the addition was 310° F. The monomer/initiator/neutralizing agent mixture consisted of 148 grams of methyl methacrylate, 168 grams of styrene, 264 grams of butyl methacrylate, 264 grams of butyl acrylate, 147.6 grams of a 96% solution (in xylene) of hydroxypropyl methacrylate, 24 grams of azo-bis-isobutyronitrile (the initiator) and 120 grams of triethyl amine (the neutralizing agent).

One hour after the monomer addition had been completed, 6 grams of di-t-butyl peroxide were added to the contents of the sealed reactor as a booster catalyst. The reaction mixture was then heated an additional 1 hour and forty minutes, after which it was cooled.

The reaction product was a viscous solution having a measured solids content of 68.8%, indicating that approximately 100% of the monomers had been converted to polymeric products.

A portion of the reaction product was reduced to a 40% non-volatile content with water and the resulting pH was adjusted to 7.1 by the incremental addition of triethyl amine. The resultant product had a viscosity of 3,680 cps. as measured with a Brookfield LTV viscometer using a No. 4 spindle at 100 r.p.m.

A 20 gram portion of this water diluted resin (i.e. at 40% NV) was then mixed with a 2.9 gram portion of an aqueous solution (68% non-volatile) of a water soluble alkylated melamine-formaldehyde condensate (Monsanto resin RI–2027; a methylated, methylol melamine-formaldehyde condensate). A 3 mil wet film of this mixture was drawn on a glass plate and cured after air drying for 15 minutes at room temperature by baking at 250° F. for 20 minutes. The resulting cured film had a Sward hardness of 38. When spot tested, a 5% solution of caustic had very little effect on the appearance and adhesion of film to the glass.

Example II

This example illustrates the preparation of an acrylic copolymer using a monomer mixture that includes a substantial amount of alpha, beta-ethylenically unsaturated carboxylic acid (i.e. acrylic acid). The copolymer is simultaneously made water dispersible.

In this example, the equipment and procedures of Example I were employed. The solvent combination consisted of 26 parts of isopropanol and 14 parts of deionized water. The monomer/initiator/neutralizing agent mixture consisted of 14.8 parts of methyl methacrylate, 16.8 parts of styrene, 22 parts of butyl acrylate, 22 parts of butyl methacrylate, 11 parts of acrylic acid, 10.8 parts of a 96% solution of hydroxypropyl methacrylate, 2 parts of azo-bis-isobutyronitrile, and 12.2 parts of triethyl amine.

Monomer addition required 2 hours. One hour later, 0.5 part of di-t-butyl peroxide were added as a booster catalyst and the reaction mixture was heated for an additional hour at 350° F. The reaction mixture was then cooled.

The non-volatile content of the reaction mixture was measured as 64% thus indicating a 98.5% conversion of monomers to polymer. The viscosity was 42.5 stokes at a pH of 7.5. The viscosities at various levels of dilution with water were as follows:

| Non-volatile content (percent): | Viscosity (stokes) |
|---|---|
| 55 | 35.5 |
| 50 | 63.6 |
| 45 | 106 |
| 40 | 29 |
| 35 | 1 |

A thermosetting coating composition was then prepared by admixing a portion of the 35% non-volatile copolymer with 20% (based on the weight of the copolymer; corrected to 100% NV) with an alkylated melamine-formaldehyde resin (Monsanto RI–2027). Next, a three mil wet draw-down was prepared on a glass plate from this composition. The wet film was cured, after air drying for 15 minutes at room temperature, by baking at 250° F. for 20 minutes. A clear, glossy, mar-resistant, tack-free adherent film was obtained.

Example III

This example illustrates the preparation of an all-acrylic water dispersible or dilutable copolymer in the absence of emulsifying agents from a monomer mixture that includes an alpha, beta-ethylenically unsaturated monocarboxylic acid.

In this example, the general procedure of Example I was again used. The solvent mixture consisted of 14 parts of deionized water and 25 parts of Cellosolve (a water miscible solvent). The monomer/initiator/neutralizing agent mixture consisted of 14.8 parts of methyl methacrylate, 60.8 parts of butyl acrylate, 10.8 parts of a 96% solution of hydroxypropyl methacrylate, 9.5 parts of acrylic acid, 0.6 parts of azo-bis-isobutyronitrile and 10 parts of triethyl amine. The reaction temperature was 350° F. Monomer addition required two (2) hours. One-half hour after monomer addition was completed, 0.5 part of di-t-butyl peroxide was added to the reaction mixture as a booster catalyst. A second shot of booster catalyst (0.4 part of di-t-butyl peroxide) was added one hour after the monomer addition had been completed. The recation mixture was heated an additional hour after the addition of the last shot of booster catalyst. Then, the reaction mixture was cooled.

The non-volatile content of the clear copolymer solution was measured as 66.3%, thus indicating essentially 100% conversion of the monomers. The solution had a viscosity of 21.4 stokes at a pH of 7.1 and an acid value (corrected to 100% NV) of 120. This measured acid value is considerably higher than the theoretical acid value of 77 based on the amount of acrylic acid used in the monomer mixture. The increase in acid value is the result of the hydrolysis of a portion of the alpha, beta-unsaturated esters in the presence of triethyl amine and water during the copolymerization reaction.

A portion of this copolymer was mixed with an aminoplast resin (Monsanto Resloom M–75 *) at a level of 20% aminoplast based on the weight of the copolymer (corrected to 100% NV). A 3 mil drawn-down of this mixture was prepared on a glass plate and cured, after air drying for 15 minutes at room temperature, by baking at 250° F. for 20 minutes. The resulting film was tack-free, clear, glossy, adherent, and had a Sward hardness of 28.

Example IV

This example illustrates the preparation of a water dilutable or dispersible copolymer from a different mixture of monomers that includes an alpha, beta-ethylenically unsaturated carboxylic acid. The equipment and general procedure of Example I were used.

In this example, the reaction medium was a mixture of 26 parts of deionized water and 21 parts of Cellosolve (a water miscible solvent). The monomer/initiator/neutralizing agent mixture consisted of 14.8 parts of methyl methacrylate, 14.8 parts of styrene, 46 parts of butyl acrylate, 10.8 parts of a 96% solution of hydroxypropyl methacrylate, 9.5 parts of acrylic acid, 0.6 part of azo-bis-isobutyronitrile, and 12 parts of triethyl amine. Monomer addition required two hours. The reaction temperature was 350° F. Two separate shorts (0.4 part each) of a booster catalyst (di-t-butyl peroxide) were added ½ hour after monomer addition was completed and again 1 hour after monomer addition was completed respectively. After the last shot of boosted catalyst had been added, the reaction mixture was heated an additional hour at 330°–350° F., and then cooled.

The non-volatile content of the resulting hazy solution was 60.0% at a viscosity of 59 stokes. Based on the non-volatile content, the conversion of monomers to copolymer was calculated as 98.3%.

A portion of this copolymer solution was diluted to 48% NV with water. The resulting viscosity was 20 stokes and the pH was 6.4. A portion of this diluted copolymer was then mixed with 20% (based on the weight of the copolymer; corrected to 100% NV) of a methylated melamine-formaldehyde resin (Monsanto RI–2027). A 3 mil draw-down on plate glass was then prepared from this mixture. The wet film was cured, after air drying at room temperature for 15 minutes, by baking at 250° F. for 20 minutes. The resulting cured film was tack-free, had excellent mar-resistance, and a Sward hardness of 44.

Example V

This example illustrates the preparation of water dispersible or dilutable copolymers using a monomer mixture free of alpha, beta-ethylenically unsaturated carboxylic acids. The equipment and general procedure of Example I were used.

In this example, the solvent mixture consisted on 20 parts of Cellosolve (a water miscible solvent) and 15 parts of deionized water. The monomer/initiator/neutralizing agent mixture consisted of 14.8 parts of methyl methacrylate, 14.8 parts of styrene, 46 parts of butyl acrylate, 10.8 parts of a 96% solution of hydroxypropyl methacrylate, 0.6 part of azo-bis-isobutyronitrile, and 10.9 parts of triethyl amine. The monomer mixture was added to the solvent mixture over a two (2) hour period of time. The reaction temperature was 350° F. Two separate shots of booster catalyst (0.4 part of di-t-butyl peroxide in each shot) were added to the reaction mixture. The first was added 15 minutes after monomer addition had been completed and the second was added 30 minutes after monomer addition had been completed. After the last shot of booster catalyst had been added, the reaction temperature of 350° F. was maintained for an additional 1½ hours. The reaction mixture was then cooled.

The reaction product was a clear copolymer solution (60.9% NV). The viscosity was 22 stokes at a pH of 9. The acid value (corrected to 100% NV) was 47. When a portion of the copolymer solution was diluted with deionized water to approximately 33% NV, a Gardner-Holdt viscosity of less than A was obtained (i.e. about ½ stoke).

A coating composition was prepared by mixing a portion of the undiluted copolymer solution with 20% of an aminoplast resin (Monsanto Resloom M–75) based on the weight of the copolymer (100% NV). A 3 mil film was drawn on plate glass and cured, after air drying at room temperature for 15 minutes, by baking at 250° F. for 20 minutes. The cured film had excellent gloss and mar-resistant characteristics. The Sward hardness was 22.

Example VI

This example illustrates the preparation of a copolymer from a monomer mixture free of alpha, beta-ethylenically unsaturated carboxylic acids and the subsequent heat treatment of this copolymer in the presence of water ---
*A methylated melamine-formaldehyde resin.

and a neutralizing agent to render the copolymer water dispersible. The equipment and general procedure of Example I were used.

Twenty-two parts of Cellosolve were placed in a sealed reactor and heated to 350° F. A monomer/initiator mixture was then added to the contents of the sealed reactor over a two (2) hour period with rapid agitation. The monomer/initiator mixture contained 14.8 parts of methyl methacrylate, 14.8 parts of styrene, 46 parts of butyl acrylate, 10.8 parts of a 96% solution of hydroxypropyl methacrylate, 6.6 parts of methyl acrylate and 0.6 part of azo-bis-isobutyronitrile. Two separate shots of booster catalyst (0.4 part of di-t-butyl peroxide) were added 15 minutes and 30 minutes, respectively after monomer addition had been completed. After the last shot of booster catalyst had been added, the reaction mixture was further heated at 350° F. for 45 minutes and then cooled.

Then, 15 parts of water and 7.7 parts of triethyl amine were charged to the reactor which was sealed and heated to 350° F. The temperature was maintained at 350° F. for 3½ hours. The reaction mixture was then cooled. The resulting copolymer solution (67.9% NV) was clear and had a viscosity of 97.3 stokes, an acid value of 47 (corrected to 100% NV) and a pH of 9. Monomer conversion was essentially 100%. When this copolymer solution was reduced to 33% NV with water, the viscosity was less than A on the Gardner-Holdt scale.

A metallic pigmented film of this copolymer solution was prepared by blending 3 parts of alumium powder (Alcoa 726) with 10 parts of n-butanol. To this dispersion was added 43 parts of methylated melamine-formaldehyde resin (Monsanto RI–2027) and 103 parts of the undiluted copolymer solution of this example. The resulting pigmented coating composition was the diluted to a Ford Cup viscosity (#2) of 18 seconds to thereby give a sprayable solution. At that viscosity, the non-volatile content of the metallic paint (i.e. copolymer plus pigment plus aminoplast) was 39.2%. This non-volatile content is substantially higher than that which can readily be obtained with metallic paints based on conventional water dispersible acrylic copolymers.

An untreated metal panel was sprayed with this paint and cured by baking at 250° F. for 20 minutes. The cured film had a thickness of 1.2–1.4 mils. The metallic control of the film was excellent. Adhesion and mar-resistance were excellent. The cured film withstood 2–3 wipes with xylol and exhibited a 20° gloss of 60.

A non-pigmented coating composition was also prepared. This composition was prepared by mixing the undiluted copolymer solution with 20% based on the weight of the copolymer (corrected to 100° NV) of a methylated melamine-formaldehyde resin (Monsanto RI–2027). A 3 mil draw-down on plate glass was cured, after air drying at room temperature for 15 minutes, by baking at 250° F. for 30 minutes. The cured film was tack-free, clear, glossy, and flexible. The Sward hardness was 24.

Although the present invention has been described with a certain degree of particularity, it will be appreciated that numerous changes and modifications to the process and products of this invention, all falling within the scope of this invention, can be made by one routinely engaged in this art when aided by this disclosure.

What is claimed is:

1. A method for preparing a water-dispersible acrylic copolymer which comprises polymerizing at a temperature between about 320° and 370° F., a vinyl comonomer mixture consisting of 35–90% by weight of a lower alkyl or hydroxyalkyl ester of a vinyl acid selected from the group consisting of acrylic acid and methacrylic acid and correspondingly from 10–65% of styrene or vinyl toluene in an aqueous solution of a water-miscible organic solvent for said vinyl monomers and in the presence of a neutralizing agent selected from the group consisting of ammonia, an alkyl mono-amine and an alkanol mono-amine for from 2 to 6 hours.

2. Process of claim 1 wherein said neutralizing agent is a tertiary amine having less than 6 carbon atoms in each of the alkyl or alkanol substituents.

3. Process of claim 2 wherein said tertiary amine is triethyl amine.

References Cited
UNITED STATES PATENTS

| | | | |
|---|---|---|---|
| 2,767,153 | 10/1956 | Sutton | 260—29.6 RW UX |
| 3,266,971 | 8/1966 | Miller, Jr. | 260—29.6 EMN UX |
| 3,311,583 | 3/1967 | Bearden | 260—29.6 TA |
| 3,337,488 | 8/1967 | Lyons | 260—29.6 H |
| 3,364,164 | 1/1968 | Lyons | 260—29.6 H |
| 2,779,751 | 1/1957 | Bredereck | 260—89.5 A |
| 3,326,781 | 6/1967 | Wilson, Jr. | 260—89.5 A X |

JULIUS FROME, Primary Examiner

J. B. LOWE, Assistant Examiner

U.S. Cl. X.R.

260—29.6 ME, 29.6 R, 85.7, 89.5 AW